US007117757B2

(12) United States Patent
Bellis, Jr.

(10) Patent No.: US 7,117,757 B2
(45) Date of Patent: Oct. 10, 2006

(54) HIGH-PRESSURE SELF CONTAINED PROBE INSERTION AND RETRACTION ASSEMBLY FOR SACRIFICIAL, CHEMICAL INJECTION AND ATOMIZATION, PNEUMATIC, AND ELECTRONIC PROBES

(76) Inventor: George Patterson Bellis, Jr., 619 North Severin St., Erath, LA (US) 70533

( * ) Notice: Subject to any disclaimer, the term of this patent is extended or adjusted under 35 U.S.C. 154(b) by 187 days.

(21) Appl. No.: 10/711,663

(22) Filed: Sep. 30, 2004

(65) Prior Publication Data

US 2006/0065066 A1    Mar. 30, 2006

(51) Int. Cl.
*G01D 21/00* (2006.01)
(52) U.S. Cl. ....................................... 73/866.5
(58) Field of Classification Search ............... 73/866.5, 73/863.85, 863.92; 137/317
See application file for complete search history.

(56) References Cited

U.S. PATENT DOCUMENTS

| 5,639,975 A * | 6/1997 | Waterman .................. 73/866.5 |
| 6,357,470 B1 | 3/2002 | Evans et al. |

* cited by examiner

Primary Examiner—Hezron Williams
Assistant Examiner—Tamiko Bellamy (57) ABSTRACT

A high-pressure probe insertion and retraction apparatus that is self contained in that it does not require additional tools to complete the insertion and retraction process. A conveyance tube is used to convey the probe into a high-pressure vessel or flowline, thereby allowing transmission of chemicals, pneumatic signals, and electronic signals, in addition to conveyance of traditional probes that do not require this transmission capability. The design of the apparatus allows the insertion and retraction process to be completed without rotation of the conveyance tube or probe, and provides the added benefit of a positive upward force for retraction of the probe when the conveyance tube has been fouled or bent during exposure to fluids within the high-pressure vessel or flowline. The apparatus further provides a positive locking mechanism to allow insertion to a variety of insertion depths with the ability to lock the apparatus at each specific depth of insertion. The apparatus further provides dedicated probes designed specifically for the functionality of the apparatus and offering improved performance, which are interchangeable, and allow a single apparatus to be used sequentially through a variety of applications that would require several apparatus's using current technology.

20 Claims, 5 Drawing Sheets

HIGH-PRESSURE SELF CONTAINED PROBE INSERTION AND RETRACTION ASSEMBLY FOR SACRIFICIAL, CHEMICAL INJECTION AND ATOMIZATION, PNEUMATIC, AND ELECTRONIC PROBES

BACKGROUND OF THE INVENTION

1. Field of the Invention

The apparatus of the present invention relates to devices for inserting and removing probes to and from the interior of a high-pressure vessel or flowline while under pressure, utilizing an entry valve typically installed onto a perpendicular branch of said high-pressure vessel or flowline for this purpose. Said entry valve isolates pressure below the entry valve and within the high-pressure vessel or flowline, thereby eliminating interruption of the fluid flow. More particularly, the present invention relates to the independently operating design of the apparatus, and the ability of a single apparatus to utilize a variety of probes including probes requiring conveyance of chemicals, pneumatic signals, or electronic signals to the inserted probe, in addition to sacrificial probes only requiring conveyance of the probe itself.

2. General Background of the Invention

In the technology of the integrity of vessels and flowlines, there has developed a technique whereby a variety of sacrificial probes, chemical injection devices, pneumatic devices, and electronic devices are used to monitor and treat certain properties of the high-pressure fluids transported within said high-pressure vessels and flowlines. Said devices require intermittent removal from said high-pressure vessels and flowlines under pressure for replacement, maintenance, or inspection. Sacrificial probes are pre-weighed samples of metal similar to the metal used in the fabrication of the high-pressure vessel or flowline. Sacrificial probes are exposed to the high-pressure fluids within the high-pressure vessel or flowline for a predefined period, and then removed for processing. The weight loss of the probe experienced during exposure to the high-pressure fluids is then converted to a mills-per-year corrosion rate estimate that can be applied to the high-pressure vessel or flowline. This method of monitoring corrosion has been in use for decades, and although new techniques for monitoring corrosion are available, the practice continues to be very common. Newer methods of monitoring corrosion and many other aspects of the high-pressure fluids contained within the high-pressure vessel or flowline require means to convey an electronic or pneumatic signal to an external device to process the collected data. These devices also require periodic retraction from the high-pressure vessel or flowline for routine maintenance or calibration. In relation to either of the methods mentioned for monitoring the properties and condition of the high-pressure fluids, there is the need for application of chemical compounds to offset the effects of the high-pressure fluids on the high-pressure vessel or flowline. Examples of probes used for this purpose include chemical injection quills that prevent immediate contact with the inner surface of the high-pressure vessel or flowline before the chemical can be absorbed into the high-pressure fluids, and chemical atomizers that reduce the particle size of the chemical for improved contact with and absorption into the high-pressure fluids.

In the current state of the art, sacrificial probes, chemical injection probes, and electronic devices require an individual apparatus to convey each of the different types of probes and devices, and are typically bulky and require additional tools to complete the insertion and retraction process. In such a device, in the current state of the art, an apparatus will utilize an externally attached drive mechanism to push the probe or device into the pressurized vessel or flowline. The drive mechanisms must either be stored, or carried with the operator, in cases where a single drive mechanism is utilized to operate several apparatuses. Said drive mechanisms typically apply force in only one direction to complete the insertion process, and rely on the pressure within the high-pressure vessel or flowline to push the probe or device to the extracted position. The rod or tube utilized in said devices to position the probe in the high-pressure vessel or flowline often accumulate a buildup of debris associated with the high-pressure fluids and are occasionally bent within the high-pressure vessel or flowline by larger debris passing through the high-pressure vessel or flowline. Examples of this debris would include accumulations of precipitated scales, paraffin waxes, and hydrates that form onto the walls of the high-pressure vessel or flowline and detach from the high-pressure vessel or flowline impacting the inserted probe. Under normal circumstances the pressure within the high-pressure vessel or flowline is sufficient to push the inserted probe out of the high-pressure vessel or flowline. The relatively common examples of complications to the extraction process caused by said debris often require a force in excess of the available pressure within the high-pressure vessel or flowline and render the apparatus inoperable. Currently available apparatuses would require the insertion tool to be removed for the application of additional force to complete the retraction of the probe, allowing for periods of non-control of the insertion rod. These periods of non-control can result in an unpredictable release of the insertion rod causing damage to the apparatus, the device, and posing a threat to the individual operating the apparatus.

BRIEF SUMMARY OF THE INVENTION

The apparatus and method of the present invention solves the problem in a simple and straightforward manner. What is provided is an insertion and retrieval tool capable of conveying each of the said types of sacrificial probes, chemical injection probes, pneumatic probes, and electronic probes. The apparatus includes a lower generally elongated body, with a fixture at the lower end of said body to threadably and sealingly attach an adapter defining a lower chamber. Said adapter further provides the means to threadably and sealingly secure the apparatus to a high-pressure vessel or flowline entry valve. There is further provided an upper generally elongated body having a lower threaded element, which threadably descends over an upper threaded portion of the lower generally elongated body, defining a specific length of travel. An upper cap portion of the upper generally elongated body is followed above and below by thrust bearing elements that convert a rotational downward or upward force to a non-rotational vertical force to a conveyance tube. The lower end of said conveyance tube is threadably and sealingly attached to the probe below the lower fixture of the lower generally elongated body within the space defined by the adapter for attachment to the high-pressure vessel or flowline. Said conveyance tube passes guidingly and sealingly through the lower fixture of the lower generally elongated body, guidingly through the upper threaded portion of the lower generally elongated body, and guidingly through said upper cap portion of the upper generally elongated body. Said lower thrust bearing located below the upper cap portion of the upper generally elongated body is followed below by a conveyance tube retaining device which compresses onto a ferrule crimped onto said conveyance tube, and defining a specific vertical position of the conveyance tube retaining device on the conveyance tube, and a specific length of travel of the conveyance tube. Said upper thrust bearing is followed above by a fixture with means to threadably and sealingly attach a cap for use in a sacrificial probe application, connection to a chemical injection source, or a means to convey an electronic or pneumatic signal. As the upper generally elongated body is rotated in a clockwise direction, the upper cap portion of the upper generally elongated body exerts a driving force to the thrust bearing below, and to the said conveyance tube retaining device. The clockwise rotation of the upper generally elongated body forces the said conveyance tube sealingly through the fixture at the lower end of the lower generally elongated body, through the adapter connecting said fixture to the entry valve and into the pressurized vessel or flowline. A counterclockwise rotation of the upper generally elongated body exerts a force against the upper thrust bearing assembly, above the upper cap portion of the upper generally elongated body, and to the conveyance tube upper fixture above, with means to attach a cap for use in a sacrificial probe application, connection to a chemical injection source, or a means to convey an electronic or pneumatic signal. Said force exerted against said conveyance tube upper fixture above is applied to the conveyance tube and retracts the conveyance tube and the attached probe into the retracted position. The Clockwise or Counterclockwise rotation of the upper generally elongated body does not require rotation of said tube or attached sacrificial probe, chemical injection device, electronic, or pneumatic probe. There is further provided a bleed valve threadably and sealingly attached to the fixture at the lower end of the lower generally elongated body to provide a sealed chamber during the insertion process, and the ability to bleed off the pressure after closing the entry valve to the pressurized vessel or flowline, in preparation to remove the apparatus from the entry valve.

Therefore it is the principle object of the present invention to provide an improved single apparatus for inserting and retracting a wide range of sacrificial probes, chemical injection devices, pneumatic probes, or electronic probes.

It is a further object of the present invention to provide an improved single apparatus that does not require any additional devices to create the force necessary to complete the insertion and retraction process.

It is a further object of the present invention to provide an apparatus wherein the tube conveying the sacrificial probes, chemical injection probes, pneumatic probes, or electronic probes, and any necessary chemicals or wiring for electronic devices is retained and driven in the insertion and retraction process, and is not free to move during the insertion or retraction process without the support of the thrust bearings of the drive assembly.

It is a further object of the present invention to provide a chemical atomization probe designed specifically for the apparatus of the present invention, that supplies a substantially improved (reduced) particle size of the atomized chemical for contact with and absorption into the high-pressure fluids.

BRIEF DESCRIPTION OF THE DRAWINGS

For a further understanding of the nature, objects, and advantages of the present invention, references should be had to the following detailed description, read in conjunction with the following drawings, wherein like reference numerals denote like elements and wherein.

DETAILED DESCRIPTION OF THE INVENTION

Figure 1:
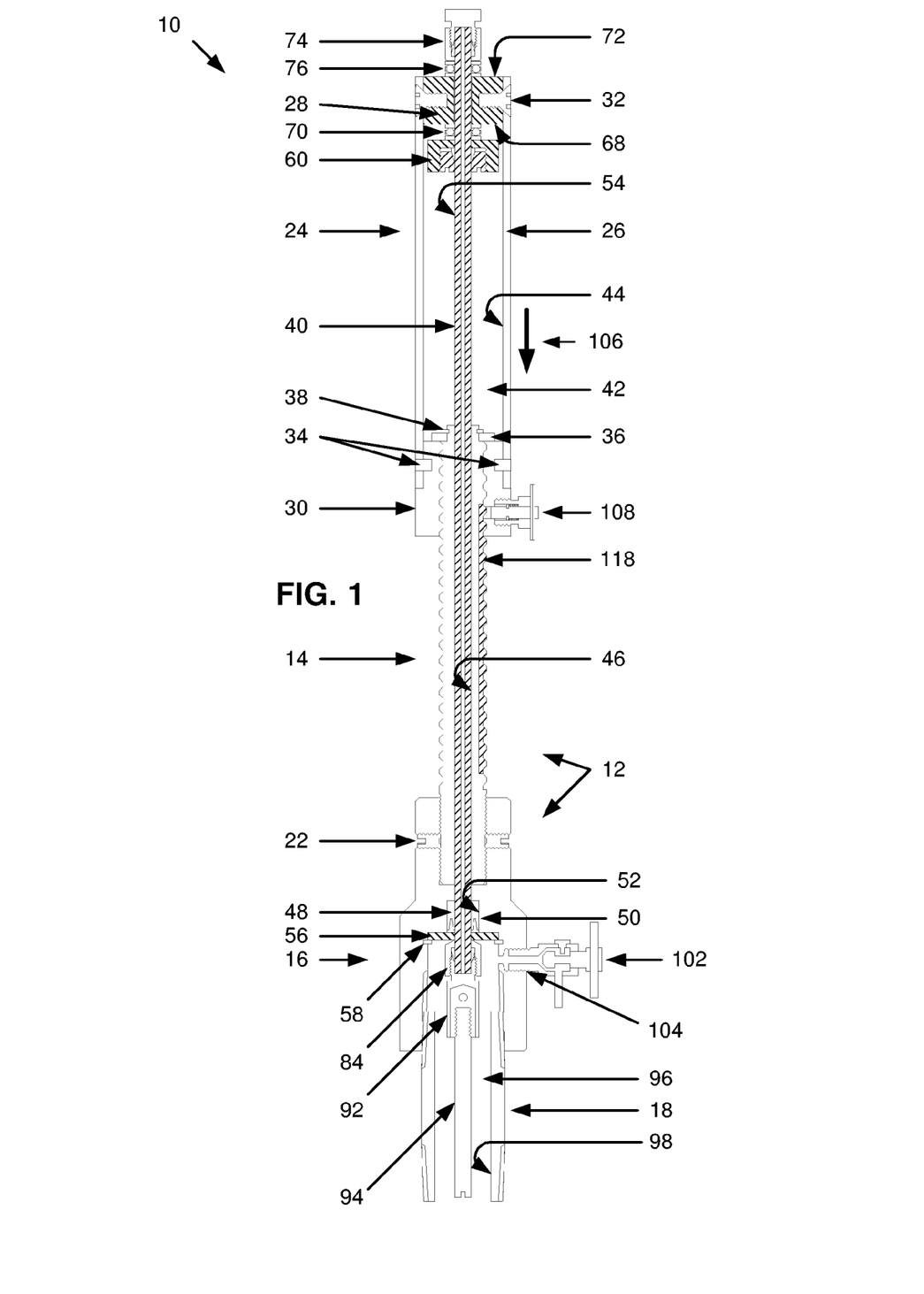
FIG. 1 comprises a side elevation in cross section and illustrates the preferred embodiment of the apparatus of the present invention with the probe in the up or retracted position in ready to be mounted on to the vessel or flowline entry valve.
Figure 2:
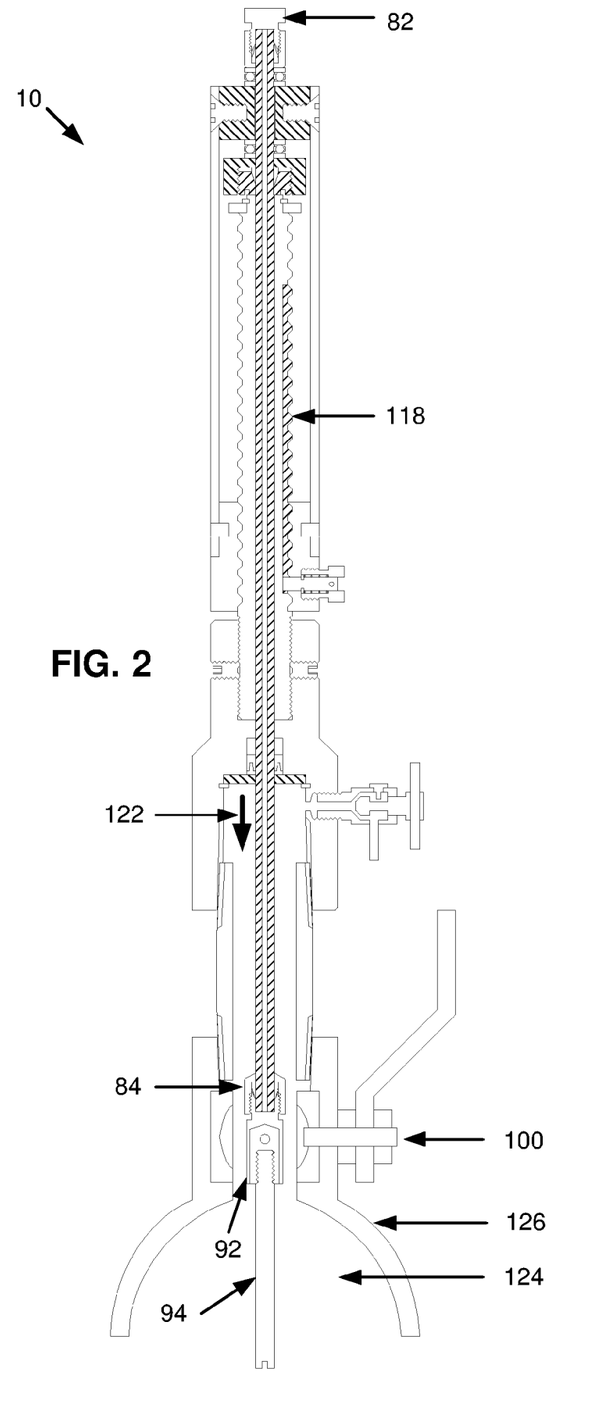
FIG. 2 comprises a side elevation in cross section and illustrates the preferred embodiment of the present invention with the assembly mounted to the vessel or flowline entry valve with the probe in the down or inserted position with the locking device engaged.

FIGS. 1–5 illustrate the preferred embodiment of the apparatus of the present invention referenced by the numeral 10. As illustrated initially in FIG. 1, the high-pressure probe insertion and retraction assembly 10 comprises a lower generally elongated body 12 comprising an externally threaded upper portion 14, threadably attached to a lower fixture 16, and having an adapter 18 threadably and sealingly attached at the lower end of lower fixture 16. Said threadable attachment of the externally threaded upper portion 14 to lower fixture 16 is completed with the installation of set-screws 22. The preferred embodiment 10 further comprises an upper generally elongated body 24 comprising a tubular element 26, an upper circular cap 28, and a lower internally threaded drive device 30, which threadably descends over the externally threaded upper portion 14, of lower generally elongated body 12. Upper circular cap 28 is attached within the upper end of tubular element 26 utilizing snake eye driven countersunk screws 32. Internally threaded drive device 30 is attached within the lower end of tubular element 26 with non-removable spiral pins 34. Clockwise rotation of the upper generally elongated body 24 provides a downward vertical movement of the upper generally elongated body to a point determined by the end of the external threading of the externally threaded upper portion 14 and the bottom thread of internally threaded drive device 30. A counter clockwise rotation of the upper generally elongated body provides an upward vertical movement of the upper generally elongated body to a point determined by contact of the upper wall of internally threaded drive device 30 with the lower wall of stop ring 36 which is retained to the top of externally threaded upper portion 14 with snap ring 38. The preferred embodiment 10 further comprises a conveyance tube 40 that passes through the upper circular cap 28 and through inner space 42 defined by the inner wall 44 of tubular element 26. The conveyance tube 40 continues downward and guidingly through a continuous inner bore of externally threaded upper portion 14, defined by inner wall 46. The conveyance tube 40 continues guidingly and sealingly through lower fixture 16 of the lower generally elongated body 14. The sealable passage of conveyance tube 40 through lower fixture 16 is provided by a sealing gland 48, located within a chamber 50, and providing a seal between inner wall 52 of chamber 50, and the outer wall 54 of conveyance tube 40. Chamber 50 is further defined below by a seal-retaining element 56, which is held in place by a snap ring 58. The conveyance tube 40 is initially retained within the preferred embodiment 10 by a conveyance tube-retaining device 60. FIG. 4C shows greater detail of said conveyance tube retaining device and should be referenced for the following numerical designations. Crimped ferrule 62 is retained in a specific vertical position on conveyance tube 40 by an externally threaded seat 64, having the same taper as the ferrule and receiving compression force from an internally threaded cap element 66, and forming a permanent indention and attachment to the conveyance tube 40 as shown in FIG. 4C. Returning to FIG. 1, said conveyance tube retaining device 60 is separated from the lower wall 68 of upper circular cap portion 28 by a lower thrust bearing 70. The upper wall 72 of upper circular cap 28 is separated from the lower wall of an upper conveyance tube fixture 74 by an upper thrust bearing 76. Upper conveyance tube fixture 74 is permanently attached to conveyance tube 40 by a crimped ferrule. FIG. 4B shows greater detail of said upper conveyance tube fixture 74 and should be referenced for the following numerical designations. Internally threaded cap portion 78, of upper conveyance tube fixture 74, is retained in place by a crimped ferrule 80 which is permanently attached to the upper end of conveyance tube 40. The plug element 82 as shown in FIG. 4B is for use with sacrificial probes that do not require conveyance of a chemical, pneumatic signals, or electronic signals, which will be discussed further. The threaded, sealable arrangement of the lower portion of plug element 82 are identical to ported elements capable of conveying chemical, pneumatic signals, or electronic signals, and will be discussed further. Returning to FIG. 1, and moving to the lower end of conveyance tube 40 below the seal-retaining element 56, there is further provided a lower conveyance tube fixture 84, permanently attached to said lower end of conveyance tube 40. Greater detail to said lower conveyance tube fixture 84 is shown in FIG. 3C and should be referenced for the following numerical designations. Internally threaded cap portion 86 of lower conveyance tube fixture 84 differs from the upper conveyance tube fixture 74, wherein said lower conveyance tube fixture 84 provides a tapered upper surface 88 to prevent said lower conveyance tube fixture 84 from "hanging" on a flat surface within the high-pressure vessel or flowline. The crimped ferrule 90 of said lower conveyance tube fixture 84 is similar to the upper conveyance tube fixture 74 wherein it is permanently attached to the conveyance tube 40. Lower conveyance tube 84 is capable of attachment to a variety of probes intended for that purpose. Returning to FIG. 1, there is further provided a sacrificial probe receptacle 92, with sacrificial probe 94 threadably inserted into an electrically insulated socket of said sacrificial probe receptacle, which will be discussed further. Said sacrificial probe 94 is positioned within inner space 96 defined by inner wall 98 of adapter 18. Said space 96 can be further defined in regards to the retention of pressure supplied by the high-pressure vessel or flowline where in it is retained at the upper end of space 96 by sealing gland 48, inner side walls formed by the threadable and sealable attachment of adapter 18 to lower fixture 16, and at the lower end by a high-pressure vessel or flowline entry valve 100 as shown in FIG. 2. There is further provided in FIG. 1, a bleed valve 102 threadably and sealingly mounted to a threaded port 104 for that purpose, and in direct communication with said inner space 96 as defined. Said bleed valve 102 allows for the retention and evacuation of pressure during sequences of the retraction and retrieval process which will be discussed further. As provided, the upper generally elongated body 24 of the preferred embodiment 10, is rotated in a clockwise fashion to achieve a downward movement as depicted in FIG. 1 by arrow 106. Clockwise rotation of the upper generally elongated body 24 is transmitted to the conveyance tube retaining device 60, by the lower wall 68 of the upper circular cap 28 and absorbed by thrust bearing 70, delivering a non-rotational downward vertical thrust to the conveyance tube retaining device 60 and the permanently attached conveyance tube 40. The vertical position of upper generally elongated body 24 in reference to threaded upper portion 14 of the lower generally elongated body 12 can be locked in said vertical position with locking device 108. Detailed reference to the said locking device 108 can be had in FIG. 4E and should be referenced for the following numerical designations. The two positions of locking device 108 are pictured in FIG. 4E as follows. Side elevation in cross section 110 and side elevation 112 of locking device 108, are in the same unlocked position as depicted in FIG. 4A locking device 108, with the embodiment of said locking device 108 rotated 90 degrees to give detail to the mechanisms ability to remain indefinitely in the unlocked position. Side elevation in cross section 114 and side elevation 116 depict the locking device 108 in the locked position with detail to provide understanding of the mechanisms ability to remain indefinitely in the locked position without manual manipulation of said locking device 108. Enlarged figures provided in FIG. 4A and FIG. 4D also provide greater detail to vertical key slot 118, and should be referenced for the remainder of the current discussion. A side elevation of an enlarged section of upper threaded portion 14 is provided in FIG. 4D with the vertical key slot 118 rotated 90 degrees, and a side elevation in cross section of locking pin 120 engaged in said vertical key slot 118. Vertical key slot 118 of threaded upper portion 14 is provided to accept the spring loaded pin 120 throughout the vertical movement of upper generally elongated body 24 on threaded upper portion 14 of lower generally elongated body 12, limited to increments defined by one full rotation of said upper generally elongated body 24. Upper and lower limits of said vertical key slot 118 can be had in FIG. 1 and FIG. 2 respectively.

FIG. 2 provides a side elevation in cross section of the preferred embodiment 10 in the down or inserted position as referenced by arrow 122 of the figure. High-pressure vessel or flowline entry valve 100 is fully open, and sacrificial probe 94 is fully inserted into the inner space 124, within the high-pressure vessel or flowline 126. The preferred embodiment 10 is pictured in FIG. 2 with an insulated sacrificial probe holder 92 attached to the lower conveyance tube fixture 84, with a sacrificial probe 94 installed. The upper conveyance tube fixture is shown with a plug element 82 installed. For future reference, and to give further meaning to FIG. 2, reference should be had to FIG. 5A–5D for the purpose of visualizing each of the probes in said figures installed onto lower conveyance tube fixture 84, and inserted to the extent of sacrificial probe 94 of the figure.

Figures 3A, 3B, 3C:
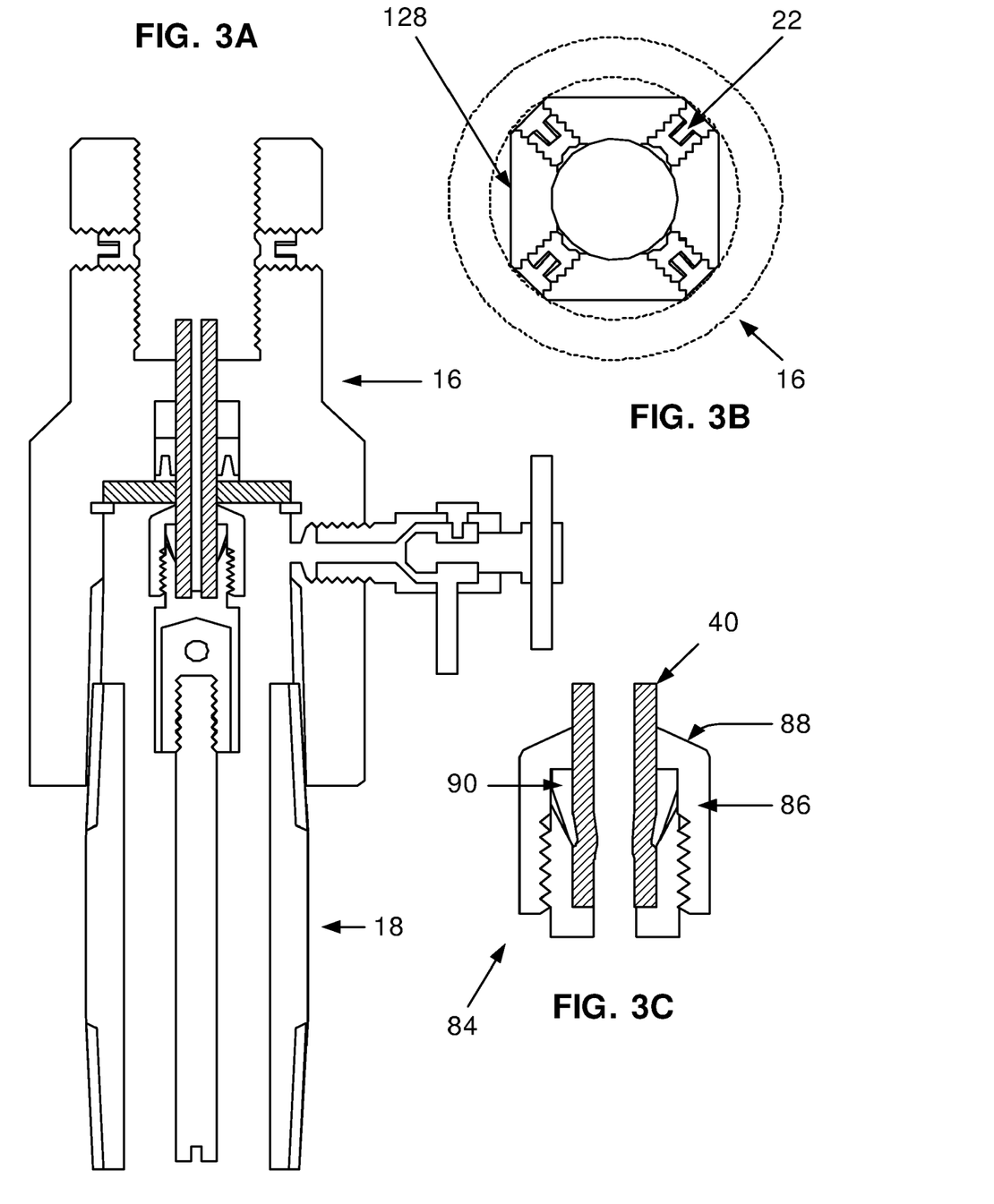
FIG. 3A comprises an enlarged side elevation of the lower portion of the lower generally elongated body in cross section and illustrates detail of the seal and retainer for passage of the conveyance tube, means to bleed pressure below the seal, and means to secure the upper portion of the lower generally elongated body.
FIG. 3B comprises a top elevation of the lower portion of the lower generally elongated body in cross section and illustrates wrench flats used to secure the preferred embodiment to a high-pressure vessel or flowline entry valve, and detail of the means to secure the upper portion of the lower generally elongated body to the lower fixture of the lower generally elongated body.
FIG. 3C comprises an enlarged side elevation in cross section of a fixture to threadably and sealably attach a probe to the lower portion of the conveyance tube.
Figures 4A, 4B, 4C, 4D, 4E:
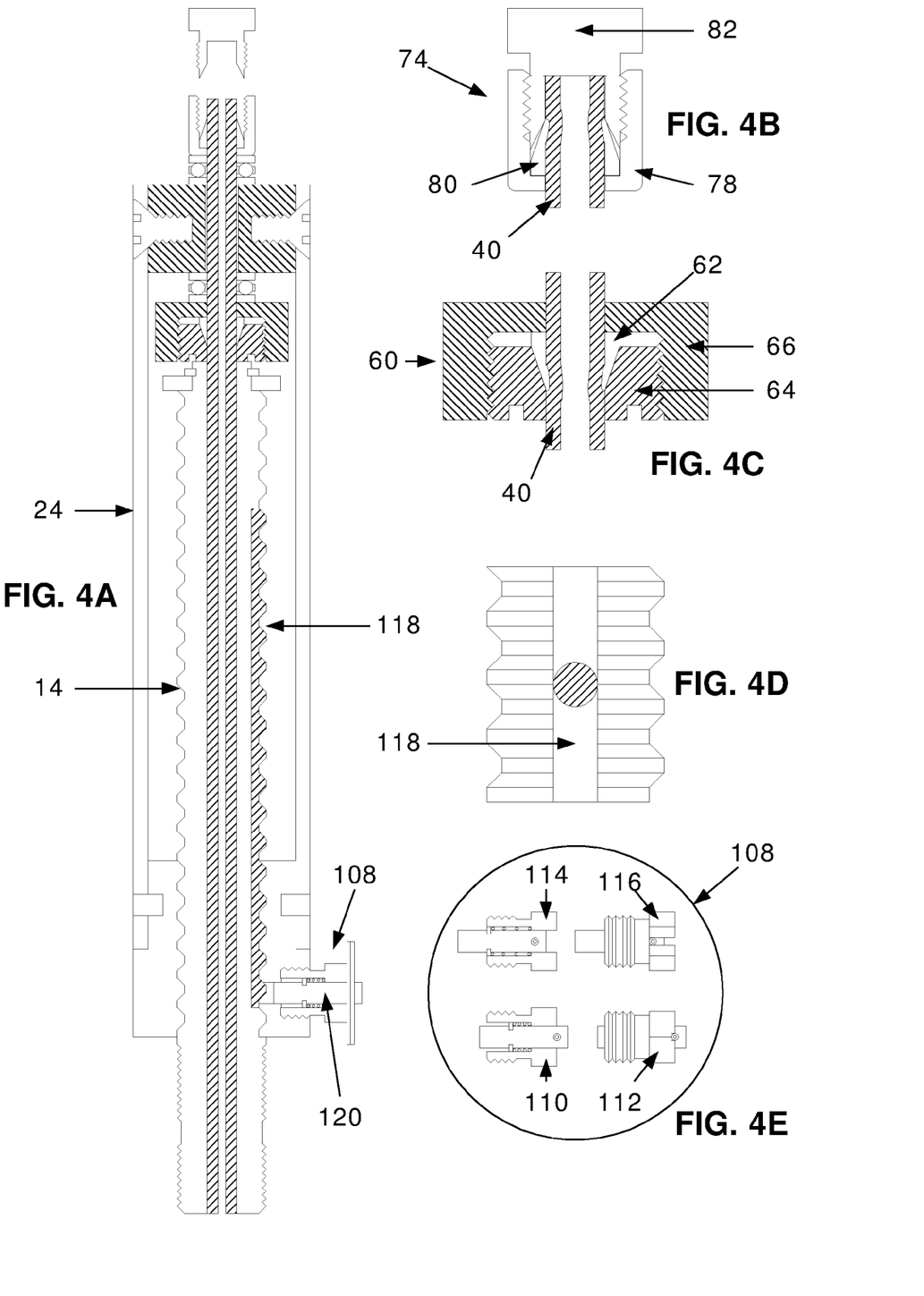
FIG. 4A comprises an enlarged side elevation of the upper generally elongated body mounted on the upper portion of the lower generally elongated body wherein the probe is in the down or inserted position.
FIG. 4B comprises a further enlarged side elevation of a fixture with means to threadably and sealably attach a chemical injection source, transmission lines for an electronic device, or a cap for use with a destructive probe as shown in the figure.
FIG. 4C comprises a further enlarged side elevation in cross section of the conveyance tube retaining device and the crimped ferrule method of attaching said retaining device to the conveyance tube.
FIG. 4D comprises a further enlarged side elevation section of the upper portion of the lower generally elongated body giving detail to the vertical key slot wherein the locking device pin rests when in the locked position.
FIG. 4E comprises a side elevation in cross section of the locked and unlocked positions of the locking device followed by non cross sectional views of the locking device to give understanding of the method and movement that defines the locked and unlocked positions. The illustrations depicting the unlocked position in this figure have been rotated 90 degrees to give further detail to the method of holding the assembly in the unlocked position.

FIG. 3A provides an enlarged side elevation in cross section, of lower fixture 16 of the lower generally elongated body 12, with adapter 18 threadably and sealingly attached thereto. FIG. 3A is provided for reference of items listed in the detailed description of FIG. 1, wherein the elements were compressed to enable a complete view of the preferred embodiment 10.

FIG. 3B provides a top elevation in cross section at setscrews 22 of the lower fixture 16, of the lower generally elongated body 12. FIG. 3B gives further detail to the arrangement of the setscrews 22, and their position in reference to wrench flats 128 that are not apparent in side elevations.

FIG. 3C referenced earlier in the detailed description provides greater detail of the lower conveyance tube fixture 84, and its permanent attachment to the lower end of the conveyance tube 40.

FIG. 4A–4D provide an enlarged side elevation in cross section of the upper generally elongated body 24, threadably descended over the externally threaded upper portion 14, and further enlarged side elevations in cross section of components and angles of components required to give understanding to the component and its purpose within the preferred embodiment 10. Each of FIG. 4A–4D are referenced earlier in the detailed description of the preferred embodiment 10 of FIG. 1–2.

Figures 5A, 5B:
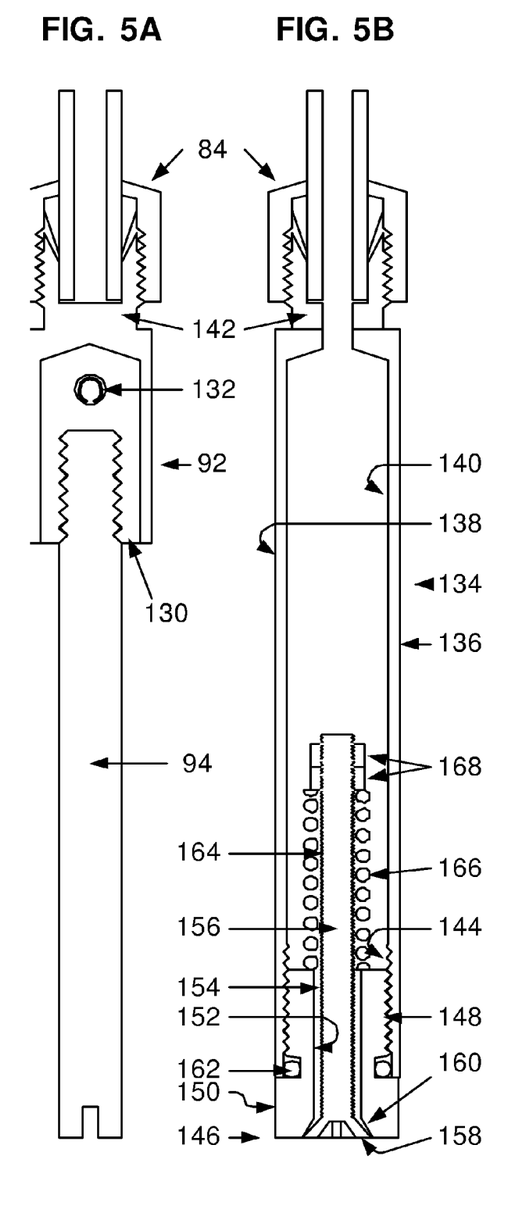
FIG. 5A comprises a side elevation in cross section of the sacrificial probe holder with a sacrificial probe installed.
FIG. 5B comprises a side elevation in cross section of liquid atomizer device designed specifically for the preferred embodiment of the present invention and offering improved (reduced) particle size of the atomized chemical for contact with and absorption into the high-pressure fluids.

FIG. 5A provides an enlarged side elevation in cross section of a sacrificial probe 94 installed into an insulated socket 130, and pinned in place with a spring pin 132, within sacrificial probe holder 92, and installed onto lower conveyance tube fixture 84, by means of upper fixture 142.

FIG. 5B provides an enlarged side elevation in cross section, of a chemical atomizer assembly 134 that was designed specifically for use in the preferred embodiment 10. Chemical atomizer assembly 134 comprises a generally elongated body portion 136, having a continuous outer wall 138 and a continuous inner wall 140. There is further provided an upper fixture 142 for threadable and sealable attachment to the lower conveyance tube fixture 84 of the preferred embodiment 10. An inner threaded portion 144 at the lower end of generally elongated body 136 provides the means to attach the chemical atomization device 146. Chemical atomization device 146 comprises a valve-seating element 148, with means to threadably and sealingly engage inner threaded portion 144. An o-ring element 162 within a space defined by a groove on the valve-seating element 148, and the threadable attachment to inner threaded portion 144 provide the seal between valve seating element 148 and generally elongated body 136. Valve seating element 148 is further defined by an outer wall 150 at the lower end, equal in diameter to the continuous outer wall 138, of generally elongated body portion 136. Valve seating element 148 further comprises an inner wall 152 defining an inner space 154 from the upper end to the lower end of valve seating element 148. There is further provided a valve element 156 comprising a larger tapered portion 158 at the lower end, to contact a tapered seat 160 at the lower end of inner wall 152 of valve seating element 148 with a intentional difference of the tapered angles of both to optimize chemical atomization. An upper externally threaded portion 164 of valve element 156 passes upward through inner space 154 of valve seating element 148, and through a compression spring 166. A nut 168 is threadably applied to the upper externally threaded portion 164 and adjusted to a pre-determined compression of the compression spring 166 to facilitate optimum atomization of the chemical in use. An additional nut 168 is utilized to lock the adjusted position of the first. The preferred embodiment 10 and the design elements of the chemical atomizer assembly 134 compliment the application and versatility of each other.

Figure 5C:
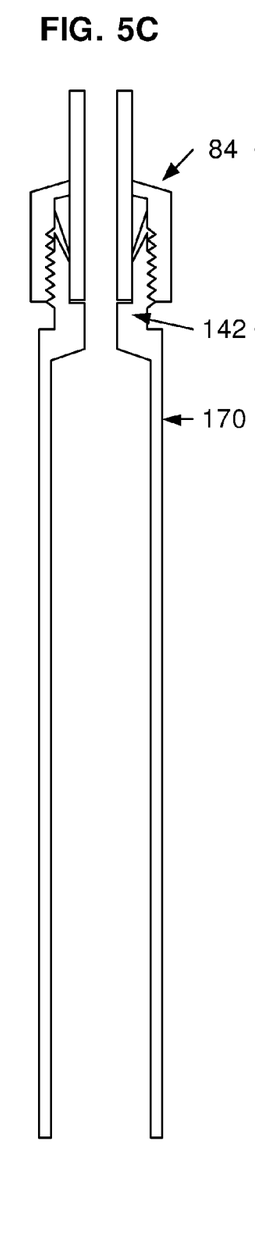
FIG. 5C comprises a side elevation in cross section of an injection quill designed specifically for the preferred embodiment of the present invention.

FIG. 5C provides a generic depiction of a chemical injection quill 170 with upper fixture 142 providing means to attach said chemical injection quill 170 to the conveyance tube lower fixture 84. The general purpose of this type of probe is to protect the injection site against chemicals that have corrosive properties.

Figure 5D:
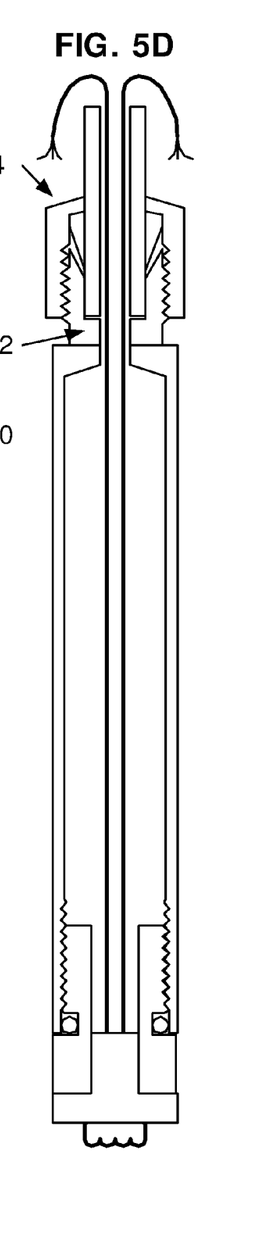
FIG. 5D comprises a side elevation in cross section of an electronic device mounted in a holder designed specifically for the preferred embodiment of the present invention.

FIG. 5D provides a generic depiction of an electronic device requiring the conveyance of an electronic signal to an external device for processing of the data collected. The electronic probes upper fixture 142 is specific to the preferred embodiment 10, however individual types of electronic monitoring devices are of too wide a range to list individually in the specification.

What is claimed is:

1. A high-pressure probe insertion and retraction apparatus comprising:
   a. A conveyance tube having threadable, sealable fixtures at the upper and lower end;
   b. An assortment of included probes designed specifically for threadable, sealable attachment to a fixture at the lower end of the conveyance tube;
   c. A conveyance tube-retaining device mounted to said conveyance tube and compressing a crimped ferrule defining a specific vertical position of the conveyance tube retaining device on the conveyance tube;
   d. A lower generally elongated body for the conveyance tube to pass guidingly and sealably through;

e. An upper generally elongated body with a drive assembly mounted at the lower end to threadably descend over the threaded upper portion of the lower generally elongated body;

f. An adapter at the lower end of the lower generally elongated body for threadable and sealable attachment of the lower fixture of the lower generally elongated body, and to the entry valve of the high-pressure vessel or flowline;

g. A bleed valve component threadably and sealably attached to a port in the lower fixture of the lower generally elongated body giving access to the high-pressure fluids within said lower fixture.

2. The apparatus in claim 1, wherein the conveyance tube member of the assembly includes a fixture at the lower end for the attachment of sacrificial probes, chemical injection probes, pneumatic probes, or electronic probes.

3. The apparatus in claim 1, wherein a chemical atomizing device designed specifically for the apparatus offers improved chemical atomization and utilization of chemicals.

4. The apparatus in claim 1, wherein the conveyance tube member of the assembly includes a fixture at the upper end for attachment and transmission of chemicals, pneumatic signals, electronic signals, or a cap element for use when the conveyance tube is used only for the physical insertion of sacrificial probes.

5. The apparatus in claim 1, wherein the upper generally elongated body descends threadably over the upper threaded portion of the lower generally elongated body defining a specific length of travel.

6. The apparatus in claim 1, wherein the adapter at the lower end of the lower generally elongated body is threadably and sealingly attached thereto, and can be replaced to accommodate a variety of different diameter and length probes.

7. The apparatus in claim 1, wherein the adapter at the lower end of the lower generally elongated body is threadably and sealingly attached thereto, and can be replaced to accommodate a variety of different size and type entry valves.

8. The apparatus in claim 1, wherein a bleed valve threadably and sealably attached to a port through the outer wall of the lower fixture of the lower generally elongated body, having access to the high-pressure fluids within said lower fixture, is used to bleed said high-pressure fluids after the retraction process and closure of the high-pressure vessel or flowline entry valve is complete.

9. A high-pressure probe insertion and retraction apparatus comprising:

a. A conveyance tube-retaining device permanently mounted to the conveyance tube by means of the compression and encasement of a crimped ferrule;

b. A conveyance tube-retaining device separated from the lower wall of the upper cap portion of the upper generally elongated body by a thrust bearing;

c. A conveyance tube upper fixture permanently mounted to the upper end of the conveyance tube by means of a crimped ferrule that becomes encased with the attachment of transmission lines or a cap element;

d. A conveyance tube upper fixture separated from the upper wall of the upper cap portion of the upper generally elongated body by a thrust bearing.

10. The apparatus in claim 9, wherein a conveyance tube-retaining device compresses a crimped ferrule onto the conveyance tube and defines a specific vertical position of the conveyance tube-retaining device on the conveyance tube.

11. The apparatus in claim 9, wherein the conveyance tube-retaining device defines a length of travel of the conveyance tube below the lower fixture of the lower generally elongated body and into the high-pressure vessel or flowline.

12. The apparatus in claim 9, wherein the conveyance tube retaining device is located below a thrust bearing that converts clockwise rotational downward vertical force from the upper cap portion of the upper generally elongated body to a non-rotational downward vertical force and to the conveyance tube retaining device permanently attached to the conveyance tube.

13. The apparatus in claim 9, wherein the conveyance tube retaining device is located below a thrust bearing that converts a counter-clockwise upward vertical force from the upper cap portion of the upper generally elongated body to a non-rotational upward force applied to the lower wall of the permanently attached upper fixture of the conveyance tube.

14. The apparatus in claim 9, wherein vertical travel of the of the upper generally elongated body caused by clockwise or counter-clockwise rotation of said upper generally elongated body is transmitted to the conveyance tube as a non-rotational force through thrust bearings mounted above and below the upper cap portion of the upper generally elongated body for that purpose.

15. A high-pressure probe insertion and retraction apparatus comprising:

a. A conveyance tube-retaining device permanently mounted to the conveyance tube and located within the space defined by the lower wall of the upper cap portion of the upper generally elongated body, and the upper wall of the threaded upper portion of the lower generally elongated body;

b. An upper cap portion of the upper generally elongated body having a thrust bearing separating the lower wall of said upper cap portion from the upper wall of the conveyance tube-retaining device;

c. An upper cap portion of the upper generally elongated body having a thrust bearing separating the upper wall of said upper cap portion from the lower wall of the permanently attached upper fixture of the conveyance tube;

d. A threaded upper portion of a lower generally elongated body with threadable engagement to the drive assembly located at the lower end of the upper generally elongated body;

e. An upper threaded portion of the lower generally elongated body having a vertical key slot, and a locking device threadably attached to the drive assembly at the lower end of the upper generally elongated body for engagement of said vertical key slot;

f. An upper generally elongated body having a knurled section of the outer wall surface.

16. The apparatus in claim 15, wherein a clockwise rotation of the upper generally elongated body will result in a vertical downward force on the conveyance tube retaining device, the attached conveyance tube, and cause delivery of the attached probe into the high-pressure vessel or flowline.

17. The apparatus in claim 15, wherein a counter clockwise rotation of the upper generally elongated body will result in a upward force on the conveyance tube retaining device, the attached conveyance tube, and cause delivery of the attached probe from the high-pressure vessel or flowline and into the space defined by the adapter at the lower end of the lower generally elongated body for this purpose.

18. The apparatus in claim 15, wherein the drive assembly located at the lower end of the upper generally elongated body comprises a locking device that in the locked position allows a spring loaded pin to rest within a vertical key slot in the upper portion of the lower generally elongated body for that purpose, and prevent further insertion through clockwise rotation of the upper generally elongated body, or further retraction through counter clockwise rotation of the upper generally elongated body.

19. The apparatus in claim 15, wherein the drive assembly located at the lower end of the upper generally elongated body comprises a locking device that in the unlocked position prevents a spring loaded pin from engaging a vertical key slot in the upper portion of the lower generally elongated body for that purpose, and allows further insertion through clockwise rotation of the upper generally elongated body, or further retraction through counter clockwise rotation of the upper generally elongated body.

20. The apparatus in claim 15, wherein manual rotational manipulation of the upper generally elongated body, comprising a knurled surface on the outer wall for this purpose, is the only required power source to complete the insertion or retraction process.

* * * * *